G. AND G. H. AMONSEN.
CLUTCH.
APPLICATION FILED JAN. 19, 1920.

1,384,225.

Patented July 12, 1921.
2 SHEETS—SHEET 1.

INVENTORS:
GILBERT AMONSEN.
GEORGE H. AMONSEN.
By Whiteley and Ruckman
THEIR ATTORNEYS.

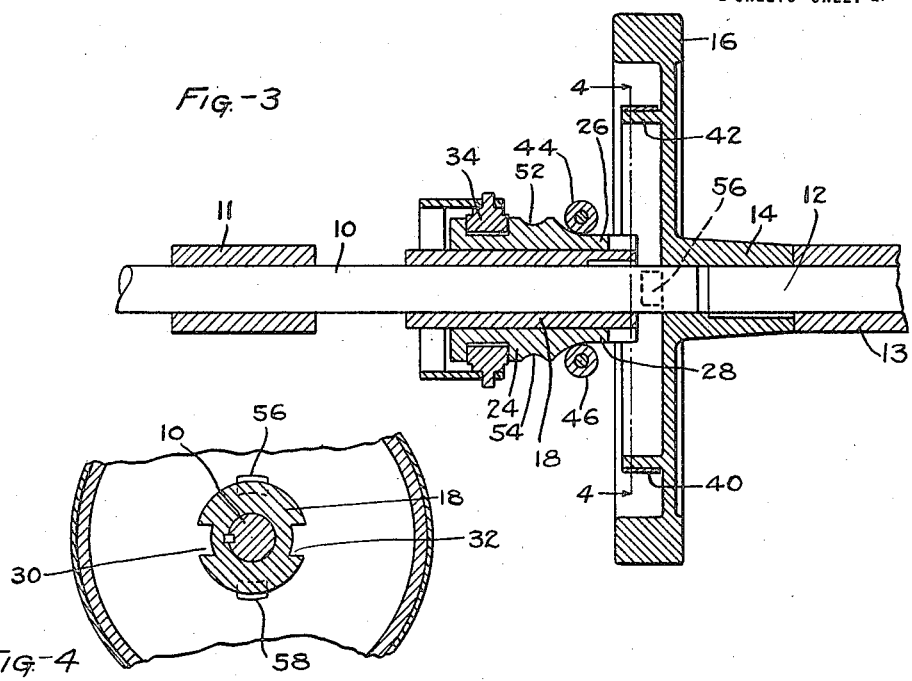
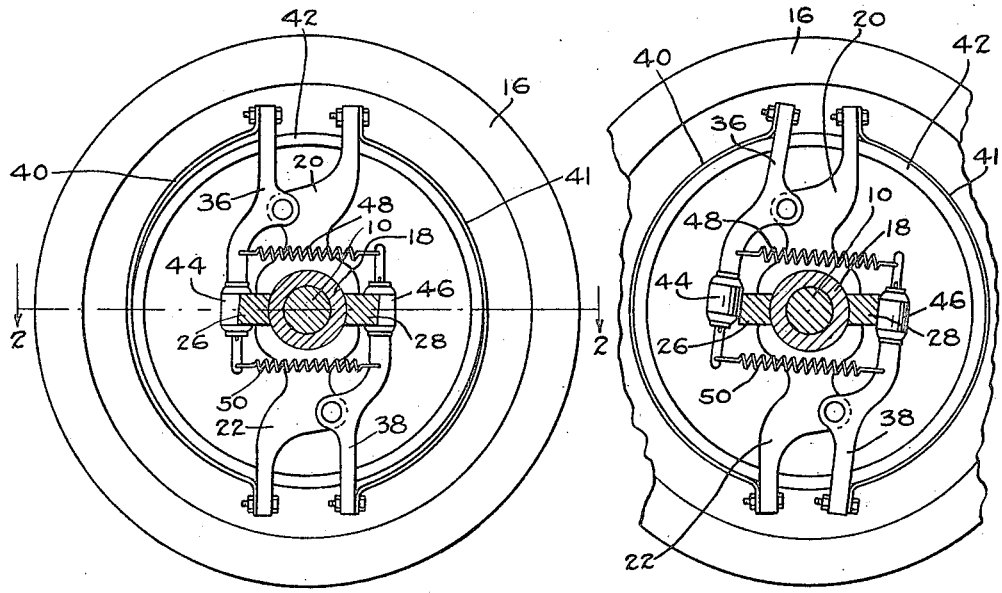

UNITED STATES PATENT OFFICE.

GILBERT AMONSEN AND GEORGE H. AMONSEN, OF MINNEAPOLIS, MINNESOTA.

CLUTCH.

1,384,225.  Specification of Letters Patent.  Patented July 12, 1921.

Application filed January 19, 1920. Serial No. 352,306.

*To all whom it may concern:*

Be it known that we, GILBERT AMONSEN and GEORGE H. AMONSEN, citizens of the United States, residing at Minneapolis, in the county of Hennepin and State of Minnesota, have invented certain new and useful Improvements in Clutches, of which the following is a specification.

Our invention relates to clutches and an object is to provide a combined frictional and positive clutch which when operated to place it in clutching engagement acts first as a frictional clutch and changes to a positive or jaw clutch so that on starting, slipping is permitted. Another object is to provide a clutch of this character in which when the jaw clutch does the driving, the frictional clutch will hold the jaw clutch engaged so that it cannot slip out of engagement until the shifting device is operated to disengage the clutch members.

The full objects and advantages of our invention will appear in connection with the detailed description thereof and the novel features embodied in our inventive idea will be particularly pointed out in the claims.

In the accompanying drawings, which illustrate the application of our invention in one form,—

Figure 1:
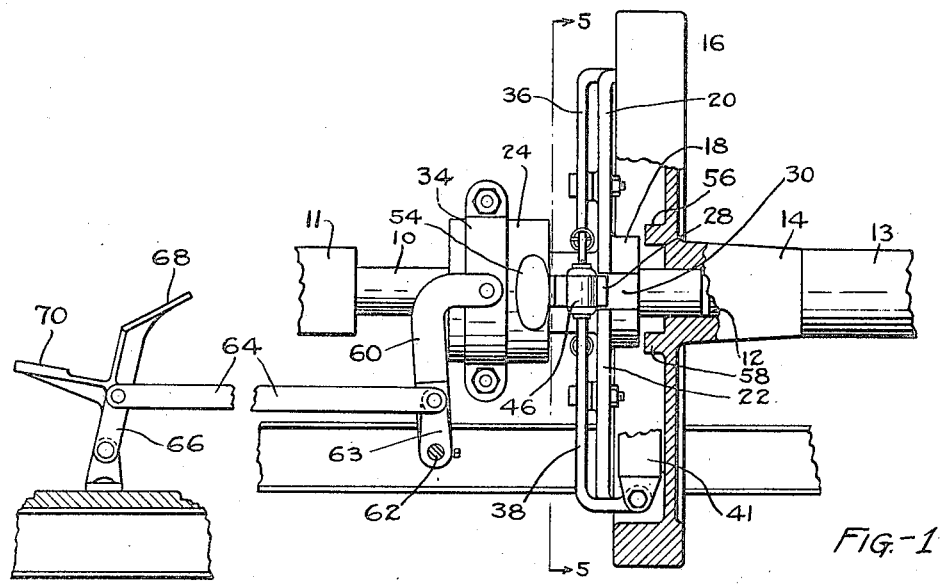
Figure 2:
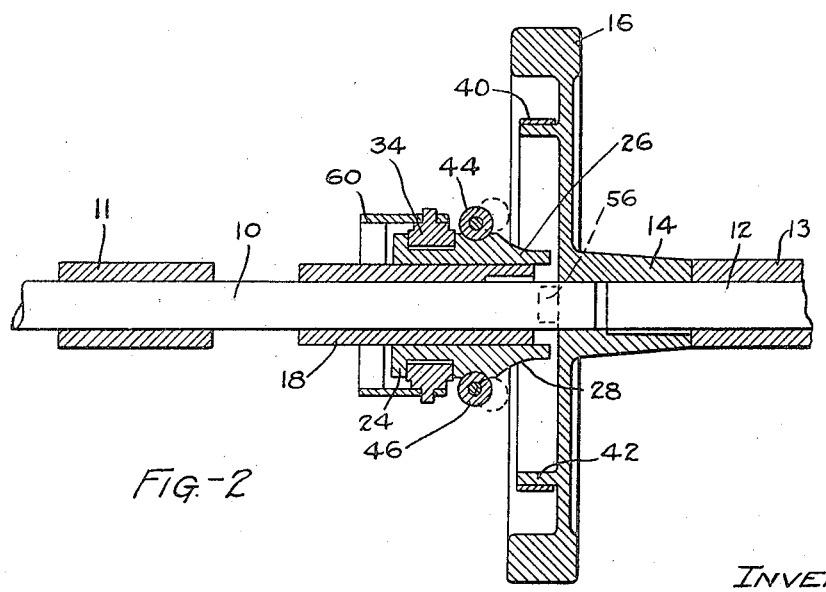

Figure 1 is a view partly in elevation and partly in section. Fig. 2 is a view mostly in longitudinal section on the line 2—2 of Fig. 5 showing the device in clutching position. Fig. 3 is a view similar to Fig. 2 but showing the device in unclutching position. Fig. 4 is a view in section on the line 4—4 of Fig. 3. Fig. 5 is a view in section on the line 5—5 of Fig. 1. Fig. 6 is a view similar to Fig. 5 showing some of the parts in another position.

Referring to the particular construction shown in the drawings, 10 and 12 designate driving and driven shafts which are mounted in bearings 11 and 13, respectively. The hub 14 of a fly-wheel 16 is secured to the end of the shaft 12 so as to extend partly beyond this shaft and permit the end of the shaft 10 to extend a short distance into the hub, as shown particularly in Figs. 2 and 3. Secured to the shaft 10 near its end is a sleeve 18 having integral arms 20 and 22. Slidably mounted on the sleeve 18 is a collar 24 which has two forwardly-extending jaws 26 and 28 which are slidable in grooves 30 and 32 formed at the enlarged end of the sleeve 18 where the arms 20 and 22 are joined thereto, as will be seen in Fig. 1. The collar 24 is provided with a circumferential groove in which loosely fits a shifter ring 34 adapted to be moved by a suitable shifting device such as will be described later. Pivotally mounted on the arms 20 and 22 are levers 36 and 38 to the outer ends of which are secured one end of each of two band members 40 and 41, the other ends of which are secured to the arms 20 and 22. The band members surround a drum 42 with which the fly-wheel 16 is provided. The band members are adapted to be contracted to grip this drum by the following mechanism. The inner ends of the levers 36 and 38 are provided with rollers 44 and 46 which are adapted to ride upon inclined surfaces of the jaws 26 and 28. Coiled springs 48 and 50 attached to the levers 36 and 38 normally hold the band members 40 and 41 expanded. When the collar 24 is slid inwardly the lever arms are moved in opposition to the tension of the springs 48 and 50 to clamp the band members 40 and 41 upon the drum 42 with frictional clutching engagement. In the position shown in Fig. 3 the shafts 10 and 12 are thus clutched frictionally so that in starting, movement will be imparted gradually from one shaft to the other without shock. Upon sliding the collar 24 still farther the rollers 44 and 46 drop into grooves 52 and 54 as shown in Fig. 2, and the collar is thereby held in this position. When this movement is given to the collar the jaws 26 and 28 will be advanced sufficiently to engage lugs 56 and 58 provided on the flat surface of the fly-wheel. The two shafts will then be positively clutched together and no slippage is permitted. When the clutch is used in connection with tractors or motor vehicles the collar 24 may be shifted by the mechanism shown in Fig. 1. The ring 34 is pivotally attached to the upper ends of a fork shifter lever 60, the lower end of which is secured to a rod 62 rotatably mounted in the frame. An arm 63 is secured to the rod 62 and a connecting rod 64 extends between the arm 63 and a foot lever 66 having a toe portion 68 and a heel portion 70. Pressure upon the toe portion 68 causes the clutch to engage, while pressure on the heel portion 70 causes it to disengage.

The operation and advantages of our invention will be obvious from the foregoing description. When the operator moves the collar 24 forwardly the frictional clutch members are first caused to engage. Since they are capable of slipping, the movement of the driving shaft is imparted gradually to the driven shaft with elimination of shocks which would otherwise occur. Upon moving the collar still farther the jaw members 26 and 28 engage the lugs 56 and 58 and the two shafts are positively locked together. In case the two shafts are mounted so that there is liability of their separating sufficiently to allow the jaw clutch to slip out of engagement, this is prevented by the engagement of the frictional clutch members which hold the two shafts together and prevent relative longitudinal movement thereof.

We claim:

1. A clutch comprising two shafts in longitudinal alinement and having their ends adjacent each other, coöperating frictional clutch members secured to said shafts respectively, two arms secured to one of said shafts, levers pivoted to said arms, a collar slidably carried by said last-mentioned shaft, jaws carried by said collar, said jaws having inclined surfaces which engage the inner ends of said levers to cause said frictional clutch members to engage when sliding movement is imparted to said collar, and lugs carried by the other of said shafts with which said jaws engage when said collar is given a further sliding movement.

2. A clutch comprising two shafts in longitudinal alinement and having their inner ends adjacent each other, a drum member secured upon the end of one of said shafts, two arms secured to the other of said shafts, levers pivoted to said arms, two band members surrounding the drum portion of said drum member, said band members having their ends secured to the outer ends of said levers and arms respectively, a collar slidably carried by the last-mentioned shaft, jaws attached to said collar, means for causing said jaws when slid to operate said levers and contract said band members upon said drum portion, and lugs on said drum member with which said jaws engage when given a further sliding movement.

3. A clutch comprising two shafts in longitudinal alinement and having their inner ends adjacent each other, a drum member secured upon the end of one of said shafts, a sleeve secured to the other of said shafts, two arms carried by said sleeve, levers pivoted to said arms, two band members surrounding the drum portion of said drum member, said band members having their ends secured to the outer ends of said levers and arms respectively, a collar slidably carried by said sleeve, jaws carried by said collar, said jaws having inclined surfaces which engage the inner ends of said levers to cause them to contract said band members upon said drum when sliding movement is imparted to said collar, springs attached to said levers for normally holding said band members expanded, and lugs on said drum member with which said jaws engage when said collar is given a further sliding movement.

4. A clutch comprising two shafts in longitudinal alinement and having their inner ends adjacent each other, a hub secured on the end of one of said shafts, said hub receiving the end of the other of said shafts, a fly-wheel carried by said sleeve, a drum on said fly-wheel, a sleeve secured to the other shaft, two arms carried by said sleeve, levers pivoted to said arms, two band members surrounding said drum, said band members having their ends secured to the outer ends of said levers and arms respectively, a collar slidably carried by the last-mentioned sleeve, jaws carried by said collar, said jaws having inclined surfaces which engage the inner ends of said levers to cause them to contract said band members upon said drum when sliding movement is imparted to said collar, springs attached to said levers for normally holding said band members expanded, lugs on said fly-wheel with which said jaws engage when said collar is given a further sliding movement, and means for holding said collar in its last-mentioned position.

In testimony whereof we hereunto affix our signatures.

GILBERT AMONSEN.
GEORGE H. AMONSEN.